US008749370B2

(12) United States Patent
Shinohara et al.

(10) Patent No.: US 8,749,370 B2
(45) Date of Patent: Jun. 10, 2014

(54) GEAR SHIFT INDICATOR

(75) Inventors: Shuntaro Shinohara, Toyota (JP);
Shinji Kato, Tokyo (JP); Kazumitsu Sugano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1 day.

(21) Appl. No.: 13/577,304

(22) PCT Filed: Feb. 23, 2011

(86) PCT No.: PCT/JP2011/001003
§ 371 (c)(1),
(2), (4) Date: Aug. 6, 2012

(87) PCT Pub. No.: WO2011/108224
PCT Pub. Date: Sep. 9, 2011

(65) Prior Publication Data
US 2012/0312222 A1   Dec. 13, 2012

(30) Foreign Application Priority Data
Mar. 1, 2010   (JP) .................................. 2010-044479

(51) Int. Cl.
*B60Q 1/00*   (2006.01)
(52) U.S. Cl.
USPC ............. 340/456; 340/439; 477/98; 477/110; 701/62
(58) Field of Classification Search
USPC ............ 340/456, 438, 439; 477/110, 125, 34, 477/98; 701/36, 50, 51, 65, 62, 64; 116/28.1, 28.3; 74/473.3, 473.21
See application file for complete search history.

(56) References Cited

U.S. PATENT DOCUMENTS

| | | | | |
|---|---|---|---|---|
| 5,053,962 A | * | 10/1991 | Genise ............................ | 701/52 |
| 5,680,307 A | * | 10/1997 | Issa et al. ....................... | 701/52 |
| 5,706,197 A | | 1/1998 | Stasik et al. | |
| 7,695,404 B2 | | 4/2010 | Saitoh et al. | |
| 7,828,695 B2 | * | 11/2010 | Inoue et al. ..................... | 477/34 |
| 8,138,906 B2 | * | 3/2012 | Wang et al. .................. | 340/456 |
| 2002/0196139 A1 | | 12/2002 | Nagasaka | |
| 2007/0270279 A1 | | 11/2007 | Saitoh et al. | |

FOREIGN PATENT DOCUMENTS

| | | |
|---|---|---|
| DE | 102 09 546 A1 | 10/2002 |
| EP | 0 695 893 A2 | 2/1996 |
| EP | 1 860 351 A1 | 11/2007 |

(Continued)

OTHER PUBLICATIONS

International Search Report issued in International Patent Application No. PCT/JP2011/001003 dated May 31, 2011 (with translation).

*Primary Examiner* — Hung T. Nguyen
(74) *Attorney, Agent, or Firm* — Oliff PLC (57) ABSTRACT

A gear shift indicator can reduce bothersome feelings of the driver. The EFI-ECU acquires information about the travelling state of a vehicle, and calculates a target gear shift stage for improving fuel consumption. The EFI-ECU acquires information about a current gear shift stage. The EFI-ECU determines that a gear shift request is generated when the current gear shift stage is different from the target gear shift stage. When the EFI-ECU determines that an AI control is under execution and that the calculated target gear shift stage is a restricted gear shift stage prohibited in the AI control, the EFI-ECU does not present a gear shift indication.

11 Claims, 6 Drawing Sheets

(56) References Cited

FOREIGN PATENT DOCUMENTS

| | | |
|---|---|---|
| EP | 1 860 354 A1 | 11/2007 |
| EP | 2 075 493 A2 | 7/2009 |
| JP | A-58-203253 | 11/1983 |
| JP | A-8-61479 | 3/1996 |
| JP | A-11-311332 | 11/1999 |
| JP | A-2000-142161 | 5/2000 |
| JP | A-2004-347032 | 12/2004 |
| JP | A-2007-309475 | 11/2007 |
| JP | A-2007-315535 | 12/2007 |
| JP | A-2007-315536 | 12/2007 |
| JP | A-2009-156420 | 7/2009 |
| WO | WO 2009/040625 A1 | 4/2009 |

* cited by examiner

|     | C1 | C2 | C3 | C4  | B1  | B2  | B3 | B4  | F1 | F2 | F3 | F4 |
|-----|----|----|----|-----|-----|-----|----|-----|----|----|----|----|
| P   |    |    |    |     |     |     |    |     |    |    |    |    |
| R   |    |    | O  |     | (O) |     |    | O   | O  |    |    |    |
| N   |    |    |    |     |     |     |    |     |    |    |    |    |
| 1st | O  |    |    | (O) |     |     |    | (O) |    |    | O  | O  |
| 2nd | O  |    |    | (O) |     | (O) | O  |     | O  | O  |    | O  |
| 3rd | O  |    | O  | (O) | (O) |     | △  |     | O  |    |    | O  |
| 4th | O  | O  | △  | (O) |     |     | △  |     |    |    |    | O  |
| 5th | △  | O  | O  |     | O   |     | △  |     |    |    |    |    |
| 6th | △  | O  |    |     | △   | O   | △  |     |    |    |    |    |

O ENGAGED

(O) ENGAGED WHEN ENGINE BRAKE IS APPLIED

△ ENGAGED NOT INVOLVED IN POWER TRANSMISSION

FIG.4

GEAR SHIFT INDICATOR

TECHNICAL FIELD

The present invention relates to a gear shift indicator, more particularly to a gear shift indicator of a vehicle having mounted thereon a manual gear transmission capable of performing a manual gear shift.

BACKGROUND ART

In general, a vehicle having mounted thereon a manual gear transmission capable of performing a manual gear shift is provided with a shift lever for shifting gear shift stages formed in the manual gear transmission by a driver. The vehicle is adapted to be changed in speed in response to the operation of the shift lever by the driver.

There is a possibility that the vehicle of this kind with the transmission mounted thereon is travelling at a gear shift stage different from a gear shift stage optimum with respect to the travelling state of the vehicle due to the fact that there are personal differences in selecting the gear shift stage and in timings of operating the gear shift. For example, when the driver is driving the vehicle at a gear shift stage lower than the optimum gear shift stage, the rotation speed of the engine tends to be unnecessarily increased, thereby leading to deterioration in fuel consumption.

For solving these problems, there has so far been known a gear shift indicating apparatus or a gear shift indicator (hereinafter simply referred to as "GSI") which is designed to execute a gear shift indicating control for controlling to instruct the driver to take the optimum gear shift stage when a current gear shift stage is different from the optimum gear shift stage acquired from engine loads, vehicle speeds and the like (see for example Patent Document 1).

The GSI disclosed in the Patent Document 1 comprises a control unit for calculating the optimum gear shift stage in response to the travelling state of the vehicle, and a display unit provided in a combination meter. The display unit has a shift-up lamp for instructing the shift-up to the driver, and a shift-down lamp for instructing the shift-down to the driver. The control unit has a gear shift map the same as a known gear shift map to be referred when setting the gear shifts in the automatic transmission, and is designed to light on the display unit the shift-up lamp or the shift-down lamp for the driver to take the optimum gear shift stage when the optimum gear shift stage acquired from the gear shift map in accordance with the engine loads and the vehicle speeds is different from the current gear shift stage.

On the other hand, there is known, in a vehicle provided with an automatic transmission, a gear shift control apparatus which is designed to execute an AI (Artificial Intelligence) control of restricting the gear shift to a predetermined gear shift stage in response to the travelling state of the vehicle, thereby optimizing the gear shift control, enhancing drivability, and alleviating a burden on the driver to carry out the driving operation (see for example Patent Document 2).

The gear shift control apparatus disclosed in the Patent Document 2 is provided with a control unit for controlling the gear shift in accordance with the vehicle travelling environment and the driving operation. For example, the known gear shift control apparatus is adapted to prohibit the shift-up and hold the current gear shift stage in the case that the accelerator is abruptly operated to be closed when the vehicle is travelling on a corner and other sharply curved roads. This means that the known gear shift control apparatus can obtain an adequate engine brake at the time of the vehicle being travelling on the corner, and can generate no shift-down at the reaccelerating time of the vehicle, thereby making it possible to avoid what is called a busy shift to perform the shift-up or the shift-down operation in a short time. This leads to the fact that the known gear shift control apparatus can stabilize the gear shift stages and can make the driving operation easy at the time of the vehicle being travelling on the corner. Further, the control unit is operative to determine whether or not the vehicle is travelling on an uphill or a downhill in accordance with the throttle opening degree, the vehicle speed and the like. When the control unit determines that the vehicle is travelling on the uphill, the control unit is operative to suppress unnecessary shift-up for the purpose of obtaining at all times a suitable driving force. When, on the other hand, the control unit determines that the vehicle is travelling on the downhill, the control unit is operative to automatically shift-down in order to obtain an appropriate brake force from a driving source.

As previously mentioned, the gear shift control apparatus disclosed in the Patent Document 2 is provided in the vehicle equipped with the automatic transmission and operative to restrict the gear shift stage in response to the travelling state of the vehicle, thereby executing the AI control to optimize the gear shift control, and thereby preventing the gear shift not to be desired by the driver and alleviating the burden on the driver to carry out the driving operation.

CITATION LIST

Patent Literature

{PTL1}
Patent Document 1: Japanese Patent Application Publication No. 2009-156420
{PTL2}
Patent Document 2: Japanese Patent Application Publication No. 2007-309475

SUMMARY OF INVENTION

Technical Problems

However, the conventional GSI disclosed in the Patent Document 1 is adapted to execute the gear shift indication control at the time of the manual gear shift operation.

In contrast, the gear shift indication control apparatus disclosed in the Patent Document 2 is adapted to generally stop the AI control at the manual gear shift time excluding under the specified travelling situations such as the case in which the vehicle speed is below the predetermined value. Therefore, the conventional gear shift indication control apparatus has a problem in which the gear shift indication control is not assumed to be executed concurrently with the AI control.

For this reason, since the gear shift indication control is executed concurrently with the AI control when the AI control comes to be executed at the manual gear shift time, the GSI has a possibility to instruct the driver to perform the gear shift to the predetermined gear shift stage in spite of the restriction of the gear shift to the predetermined gear shift stage in response to the execution of the AI control, thereby causing a possibility of having the driver feel laborious to the driving operation.

The present invention has been made for solving the conventional problems as previously mentioned, and has an object to provide a gear shift indicator which can reduce bothersome feelings of the driver in a vehicle provided with a manual gear transmission capable of performing a manual gear shift.

Solution to Problem

For achieving the previously mentioned object, the gear shift indicator according to the present invention is used in a vehicle having mounted thereon a manual gear transmission capable of performing a manual gear shift, and encouraging gear shift instructions to a driver, comprising: a target gear shift stage setting unit that sets a target gear shift stage in accordance with the travelling state of the vehicle, a presentation unit that presents the gear shift instructions when a current gear shift stage and the target gear shift stage are different from each other, and a restriction unit that restricts the current gear shift stage from being transferred to a predetermined gear shift stage in accordance with the travelling state of the vehicle, the presentation unit is operative to restrict the presentation of the gear shift instructions when the target gear shift stage is a gear shift stage restricted by the restriction unit.

By the above construction of the gear shift indicator as set forth in the above definition, the gear shift indicator according to the present invention can prevent the gear shift instructions to the gear shift stage restricted by the restriction unit from being performed by the presentation unit, thereby making it possible to prevent bothersome feelings from being given to the driver for the gear shift instructions to be performed by the presentation unit.

In the gear shift indicator according to the present invention as set forth in the above definition, the presentation unit is preferably operative to present either one of the target gear shift stage and the gear shift ranges having an upper limit gear shift stage constituted by the target gear shift state.

By the above construction of the gear shift indicator as set forth in the above definition, the gear shift indicator according to the present invention can prevent the gear shift instructions to the gear shift stage restricted by the restriction unit from being performed by the presentation unit in the case that the gear shift stages are shifted by the manual gear shift. The gear shift indicator according to the present invention can also prevent the gear shift instructions to the gear shift ranges having an upper limit gear shift stage constituted by the gear shift stage restricted by the restriction unit from being performed by the presentation unit in the case that the gear shift ranges are shifted. As a result, it is possible to prevent the bothersome feelings from being given to the driver for the gear shift instructions to be performed by the presentation unit.

In the gear shift indicator according to the present invention as set forth in the above definition, the presentation unit is preferably operative to present no gear shift instructions when the target gear shift stage is a gear shift stage restricted by the restriction unit.

By the above construction of the gear shift indicator as set forth in the above definition, the gear shift indicator according to the present invention can present no gear shift instructions to the gear shift stage restricted by the restriction unit, thereby making it possible to prevent the bothersome feelings from being given to the driver for the gear shift instructions to be performed by the presentation unit.

In the gear shift indicator according to the present invention as set forth in the above definition, the presentation unit is preferably operative to present the gear shift instructions after a predetermined time lapses when the target gear shift stage is a gear shift stage restricted by the restriction unit.

By the above construction of the gear shift indicator as set forth in the above definition, the gear shift indicator according to the present invention can reduce the frequency of the gear shift instructions performed by the presentation unit to the gear shift stage restricted by the restriction unit, thereby making it possible to prevent the bothersome feelings from being given to the driver for the gear shift instructions to be performed by the presentation unit.

In the gear shift indicator according to the present invention as set forth in the above definition, the target gear shift stage setting unit is preferably operative to set the gear shift stage of reducing fuel consumption lower than that of the current gear shift stage as the target gear shift stage.

By the above construction of the gear shift indicator as set forth in the above definition, the gear shift indicator according to the present invention can encourage the driver to perform the gear shift to the gear shift stage at which the fuel consumption can be improved, so that the fuel consumption of the vehicle can be improved, and the gear shift indication to the restricted gear shift stage by the presentation unit can be prevented from being carried out, thereby making it possible to prevent the bothersome feelings from being given to the driver.

In the gear shift indicator according to the present invention as set forth in the above definition, the restriction unit is preferably operative to set a gear shift stage to be restricted in accordance with the degree of inclination of the road surface on which the vehicle is travelling.

By the above construction of the gear shift indicator as set forth in the above definition, the gear shift indicator according to the present invention can prevent a busy shift having the gear shift stages shifted every time the accelerator pedal is depressed or released, by restricting the gear shift stage by the restriction unit, for example, when the vehicle is travelling on the rugged roads having surfaces inclined such as mountainous roads. Further, the gear shift indicator can prevent the gear shift indication to the restricted gear shift stage from being carried out by the presentation unit even in the travelling state of the vehicle as previously mentioned, thereby making it possible to prevent the bothersome feelings for the gear shift indications by the presentation unit from being given to the driver.

In the gear shift indicator according to the present invention as set forth in the above definition, the restriction unit is preferably operative to set a gear shift stage to be restricted in accordance with the oil temperature of hydraulic oil to be supplied to the gear transmission.

By the above construction of the gear shift indicator as set forth in the above definition, the gear shift indicator according to the present invention can restrict the gear shift to the low gear shift stage when the temperature of the hydraulic oil is at a high temperature level, thereby making it possible to protect the transmission. Even in the travelling state of the vehicle as previously mentioned, the gear shift indicator can prevent the gear shift indication to the restricted gear shift stage from being carried out by the presentation unit, thereby making it possible to prevent the bothersome feelings for the gear shift indications by the presentation unit from being given to the driver.

In the gear shift indicator according to the present invention as set forth in the above definition, the vehicle is preferably provided with a navigation device for outputting signals indicative of information about the current position of the vehicle and at least information about roads ahead of the current position, and the restriction unit is preferably operative to set the restricted gear shift stage in accordance with the signal inputted from the navigation device.

By the above construction of the gear shift indicator as set forth in the above definition, the gear shift indicator according to the present invention can restrict the gear shift stage in accordance with the signal inputted from the navigation device to enable the optimized travelling state of the vehicle to be realized. In addition, the gear shift indicator can prevent the gear shift indication to the restricted gear shift stage from being carried out by the presentation unit, thereby making it possible to prevent the bothersome feelings for the gear shift indications by the presentation unit from being given to the driver.

Advantageous Effects of Invention

The present invention can provide a gear shift indicator which can reduce bothersome feelings to the driver in a vehicle provided with a gear transmission capable of performing a manual gear shift.

DESCRIPTION OF EMBODIMENTS

The gear shift indicator according to the embodiment of the present invention will be described hereinafter with reference to FIGS. 1 to 6. Firstly, the construction will be explained hereinafter.

Here, the embodiment of the present invention will be explained about the case in which the gear shift indicator according to the present invention is applied to a FR (Front engine Rear drive) vehicle having an automatic transmission mounted thereon.

Figure 1:
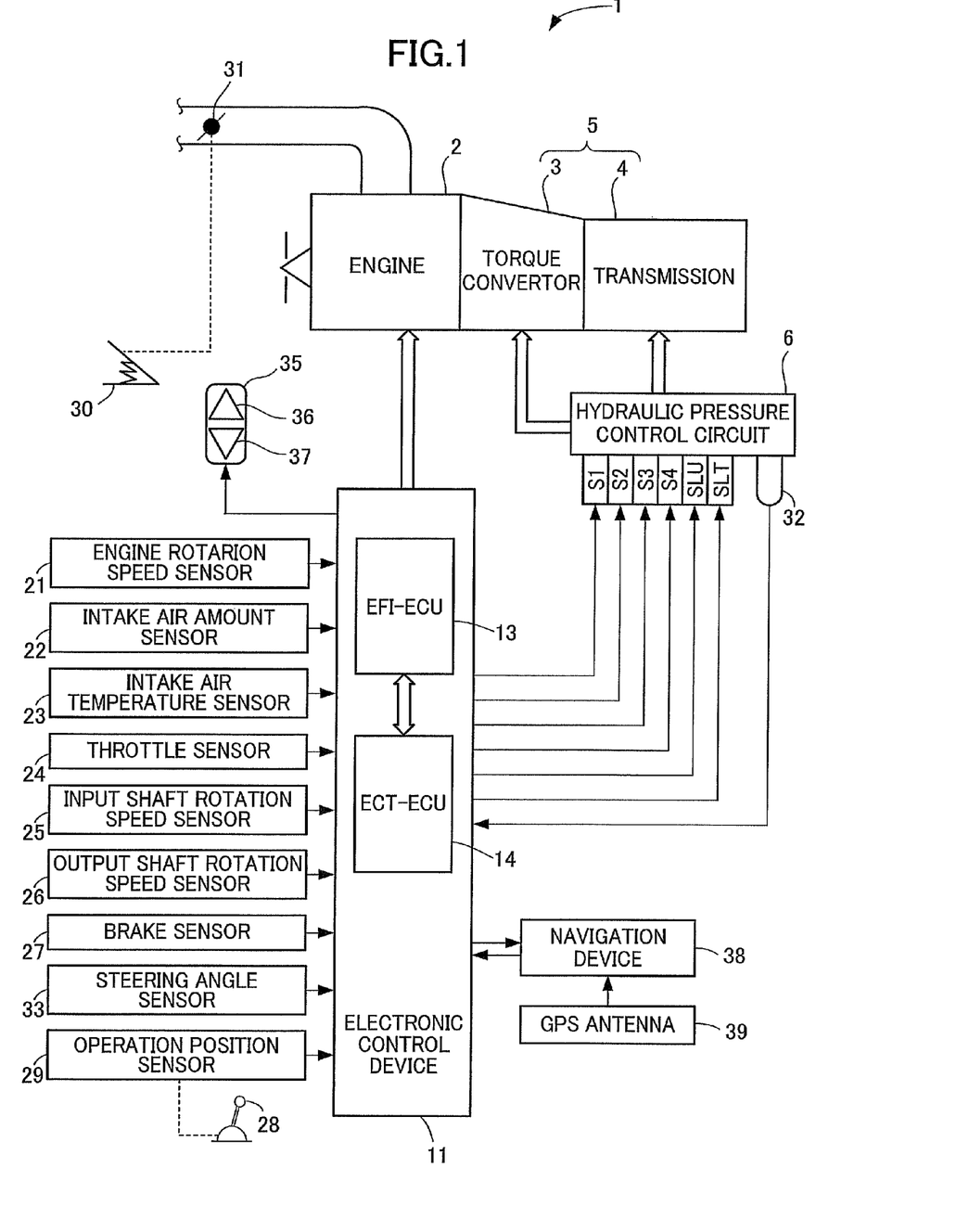
FIG. 1 is a schematic construction view showing a vehicle having mounted thereon a gear shift indicator according to the embodiment of the present invention.
Figure 2:
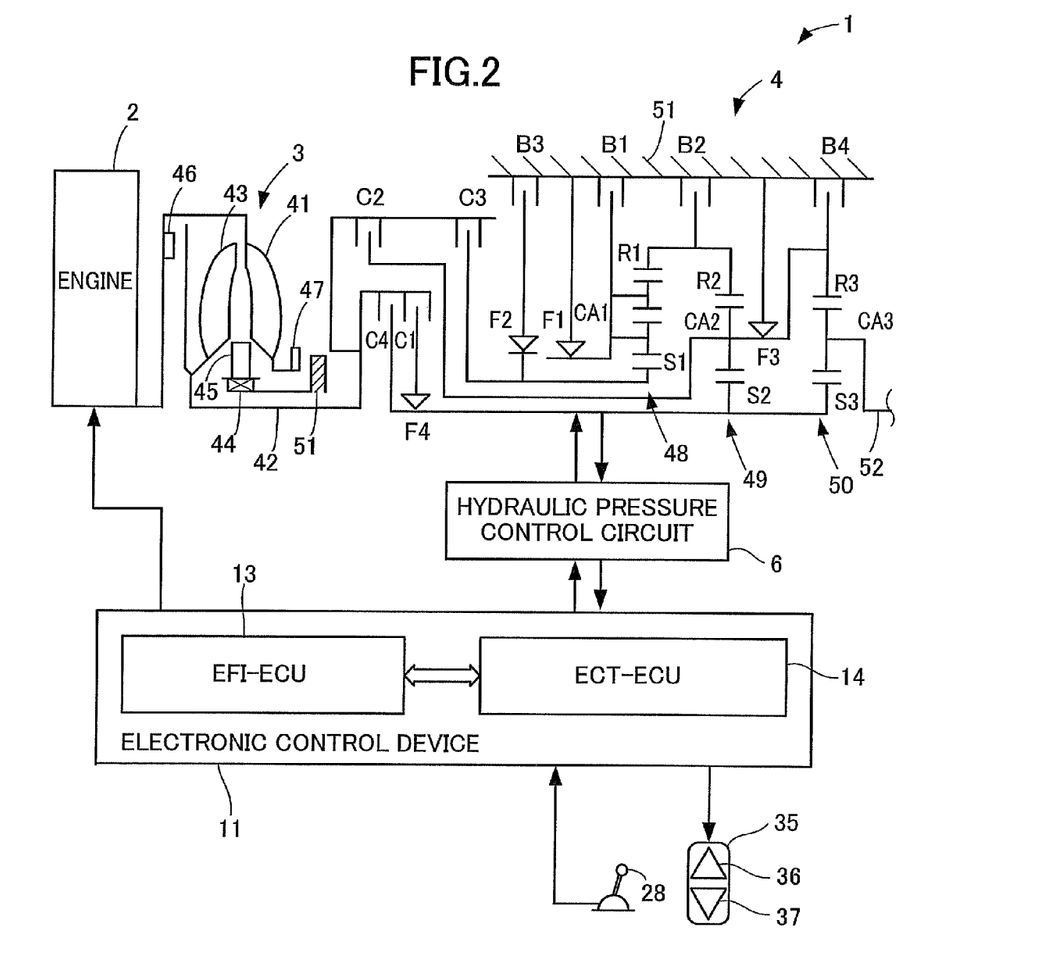
FIG. 2 is a skeleton view showing the construction of a control apparatus of the vehicle according to the embodiment of the present invention.

As shown in FIGS. 1, 2, a vehicle 1 is provided with an engine 2, a torque convertor 3 for increasing the rotational torque outputted from the engine 2, and a transmission mechanism 4 for changing and outputting the rotation speed of the output shaft of the torque convertor 3, so that the rotational torque outputted from the transmission mechanism 4 can be transmitted to driven wheels through a differential gear not shown.

The engine 2 is constructed by a known internal combustion engine operative to burn fuel such as gasoline or light oil and the like to output a driving force. The torque convertor 3 and the transmission mechanism 4 constitute in combination an automatic transmission 5.

The torque convertor 3 is disposed between the engine 2 and the transmission mechanism 4, and has a pump impeller 41 connected to the engine 2, a turbine impeller 43 connected to an input shaft 42 forming part of the transmission mechanism 4, a stator impeller 45 operative to be checked in a one-way rotation by an one-way clutch 44. The driving force is adapted to be transmitted between the pump impeller 41 and the turbine impeller 43 through fluid.

The torque convertor 3 is provided with a lock-up clutch 46 for directly connecting the pump impeller 41 with the turbine impeller 43, so that the lock-up clutch 46 can directly and mechanically connect the pump impeller 41 with the turbine impeller 43 by way of a hydraulic oil to increase the transmission efficiency of the power transmitted from the engine 2 to the transmission mechanism 4. Here, the lock-up clutch may be adapted to execute a flex lock-up to have the lock-up clutch 46 slip at a predetermined slip ratio.

The pump impeller 41 is provided with an oil pump 47 mechanically operated to generate hydraulic pressure for performing the gear shift control of the transmission mechanism 4, and other hydraulic pressures for supplying lubrication oil to each section partly forming the engine.

The transmission mechanism 4 is provided with a first planetary gear device 48 of a double-pinion type, a second planetary gear device 49 of a single-pinion type, and a third planetary gear device 50. The first planetary gear device 48 has a sun gear S1 adapted to be connectable with the input shaft 42 through a clutch C3, and connectable with a housing 51 through a one-way clutch F2 and a brake B3. The sun gear S1 is prevented from being rotated in a direction opposite to the direction of the rotation of the input shaft 42.

The first planetary gear device 48 has a carrier CA1 adapted to be connectable with the housing 51 through a brake B1. Further, the carrier CA1 is at all times checked in rotation in an opposite direction by a one-way clutch F1 disposed in parallel with the brake B1.

The first planetary gear device 48 has a ring gear R1 connected with a ring gear R2 forming part of the second planetary gear device 49 and adapted to be connectable with the housing 51 through a brake B2. The second planetary gear device 49 has a sun gear S2 connected with a sun gear S3 forming part of the third planetary gear device 50, and adapted to be connectable with the input shaft 42 through a clutch C4. Further, the sun gear S2 is adapted to be connectable with the input shaft 42 through a one-way clutch F4 and a clutch C1, and to be at all times checked in rotation in an opposite direction.

The second planetary gear device 49 has a carrier CA2 connected with a ring gear R3 forming part of the third planetary gear device 50, and adapted to be connectable with the input shaft 42 through a clutch C2 and connectable with the housing 51 through a brake B4. Further, the carrier CA2 is adapted to be checked in rotation in an opposite direction by a one-way clutch F3 disposed in parallel with the brake 4. The carrier CA3 of the third planetary gear device 50 is connected with an output shaft 52.

Figure 3:
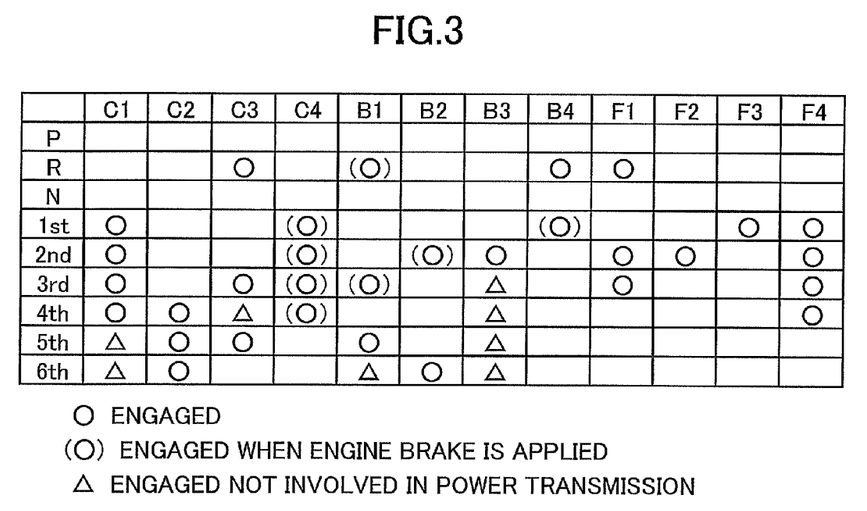
FIG. 3 is an operation table of an automatic transmission according to the embodiment of the present invention.

The clutches C1 to C4 and the brakes B1 to B4 (hereinafter simply referred to as a clutch C and a brake B unless otherwise specifically differentiated) are each constituted by a hydraulic pressure type of friction engagement device which is controlled to be selectively engaged or disengaged by a hydraulic actuator such as a multi-plate type of clutch and brake, etc. Further, the clutch C and the brake B are each adapted to take either one of an engaged state and a disengaged state in response to the hydraulic circuit changed in accordance with the energization states or the deenergization states selectively taken by the transmission solenoids S1 to S4 and the linear solenoids SLT, SLU partly forming a hydraulic control circuit 6 to be described hereinafter, or in accordance with the operation state of the manual valve not shown in FIGS. This means that the transmission mechanism 4 is operative to take gear shift stages in response to the combinations of the engagements and disengagements of the clutch C and the brake B as shown in FIG. 3. The transmission mechanism 4 according to the present embodiment is adapted to take either one of six forward shift gear stages consisting of first to sixth shift gear stages and one rearward shift gear stage.

The vehicle 1 is further provided with the hydraulic control circuit 6 for hydraulically controlling the increase ratio of the torque by the torque convertor 3 and the shift gear stages of the transmission mechanism 4. The hydraulic pressure control circuit 6 has AT oil temperature sensors 32 for measuring the temperatures of the hydraulic oil in the transmission solenoids S1 to S4 and the linear solenoids SLT, SLU.

The vehicle 1 is further provided with an engine rotation speed sensor 21 for measuring the rotation speed of the engine 2, an intake air amount sensor 22 for measuring the intake air amount of the engine 2, an intake air temperature sensor 23 for measuring the temperature of air to be suctioned into the engine 2, a throttle sensor 24 for measuring the opening degree of a throttle valve 31, an input shaft rotation speed sensor 25 for detecting the rotation speed of the input shaft 42 of the transmission mechanism 4, an output shaft rotation speed sensor 26 for detecting the rotation speed of the output shaft 52 of the transmission mechanism 4, and a brake sensor 27 for measuring the depression force of the brake pedal. The vehicle 1 is further provided with a shift lever 28, an operation position sensor 29 for detecting the positions of the shift lever 28, an accelerator opening degree sensor 30 for detecting the opening degree of the accelerator, and a steering angle sensor 33.

The engine rotation speed sensor 21 is adapted to measure the rotation speed of the engine 2 in accordance with the rotation of a crankshaft not shown to output a signal indicative of the engine rotation speed to an EFI-ECU (Electronic Fuel Injection-Electronic Control Unit) 13 which will become apparent hereinafter as the description proceeds.

The throttle sensor 24 is constructed by a hall element capable of obtaining an output voltage in response to the throttle opening degree of the throttle valve 31 to output a signal indicative of the throttle opening degree to the EFI-ECU 13. The input shaft rotation speed sensor 25 is adapted to output a signal indicative of the input shaft rotation speed of the transmission mechanism 4 to the EFI-ECU 13.

The output shaft rotation speed sensor 26 is adapted to output a signal indicative of the output shaft rotation speed of the transmission mechanism 4 to the EFI-ECU 13. The operation position sensor 29 is adapted to detect the operation position of the shift lever 28 operated by the driver.

The brake sensor 27 is adapted to measure the master cylinder pressure or the operation stroke varied in response to the depression force of the brake pedal caused by the driver to output a brake depression force signal indicative of the brake depression force thus detected to the EFI-ECU 13.

The accelerator opening degree sensor 30 is constructed by an electronic position sensor using a hall element, and adapted to output to the EFI-ECU 13 a signal indicative of the position of the accelerator, i.e., the accelerator opening degree when the accelerator mounted on the vehicle 1 is operated by the driver.

The steering angle sensor 33 is adapted to detect the steering torque of a steering shaft connected to a steering wheel to output a signal indicative of the steering torque of the steering shaft to the EFI-ECU 13. The EFI-ECU 13 is operative to calculate the steering amount of the steering wheel in the left or right direction in accordance with the signal inputted from the steering angle sensor 33.

The vehicle 1 is further provided with a display unit 35 for selectively indicating the shift-up or the shift-down to the driver when there is generated a gear shift request in a gear shift indication control as described hereinafter. The display unit 35 has a shift-up lamp 36 to be lit for indicating the shift-up, and a shift-down lamp 37 to be lit for indicating the shift-down. The shift-up lamp 36 and the shift-down lamp 37 are each constructed by a LED (Light Emitting Diode).

The vehicle 1 is further provided with an electronic control device 11 for controlling the fuel injections in the engine 2 and the gear shifts in the automatic transmission 5. The electronic control device 11 is adapted to control the engine 2 and the automatic transmission 5 in accordance with various data regarding vehicle speeds, the throttle opening degrees and the like inputted from the above sensors, a gear shift map indicative of a gear shift diagram memorized in the ROM, and a program for executing the gear shift control.

The electronic control device 11 is provided with the EFI-ECU 13 that controls the engine 2, and an ECT (Electronic Controlled Automatic Transmission)-ECU 14 that controls the automatic transmission 5. The electronic control device 11 may be further provided with a plurality of not shown ECUs such as a brake ECU for controlling the brake of the vehicle 1.

The EFI-ECU 13 constituting part of the gear shift indicator according to the present invention has a CPU (Central Processing Unit), a RAM (Random Access Memory), a ROM (Read Only Memory), and an input/output interface, not shown and is adapted to output an engine control signal to the engine 2 to control the engine 2 in response to the operation amount of the accelerator pedal.

The EFI-ECU 13 is connected with the engine rotation speed sensor 21, the intake air amount sensor 22, the intake air temperature sensor 23, the throttle sensor 24, the input shaft rotation speed sensor 25, the output shaft rotation speed sensor 26, the brake sensor 27, the operation position sensor 29, and the AT oil temperature sensor 32, and is adapted to be inputted with the signals respectively indicative of the engine rotation speed, the intake air amount, the intake air temperature, the throttle opening degree, the input shaft rotation speed, the output shaft rotation speed, the brake depression force, the operation position of the shift lever 28, and the AT oil temperature. The EFI-ECU 13 is adapted to send the signal indicative of the gear shift to the ECT-ECU 14 and to execute the AI control and the gear shift indication control described hereinafter in accordance with the information inputted from the above sensors and the gear shift map indicative of the gear shift diagram memorized in the ROM.

The EFI-ECU 13 is operative to have an automatic gear shift mode that selects the gear shift stages in response to the travelling states of the vehicle 1, and a manual gear shift mode that selects the gear shift stages in response to the manual operation performed by the driver. Here, the term "travelling state of the vehicle 1" is intended to mean the states including the speed, the throttle opening degree, the input shaft rotation speed, and the AT oil temperature of the vehicle 1.

The ECT-ECU 14 has a CPU, a RAM, a ROM and an input/output interface not shown, and is adapted to receive signals indicative of the gear shift stages to be shifted from the EFI-ECU 13. The ECT-ECU 14 is further adapted to be inputted with the signals indicative of the throttle opening degree, the output shaft rotation speed, the input shaft rotation speed, the brake depression force, the operation position of the shift lever 28, and the hydraulic oil temperature, respectively from the throttle sensor 24, the output shaft rotation speed sensor 26, the input shaft rotation speed sensor 25, the brake sensor 27, the operation position sensor 29, and the AT oil temperature sensor 32. The ECT-ECU 14 is further adapted to control the hydraulic pressure control circuit 6 to control the torque convertor 3 and the gear shift stages of the automatic transmission 5 in accordance with the above inputted signals. The ECT-ECU 14 is further adapted to control the gear shift stages in accordance with the control information of the AI control to be executed by the EFI-ECU 13. The ROM is adapted to memorize the program and the like to execute the gear shift control.

Figure 4:
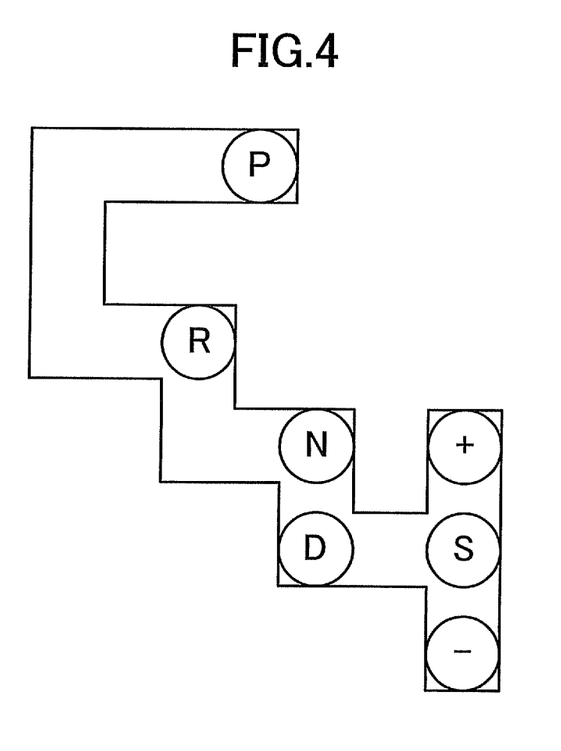
FIG. 4 is a schematic view showing a gate pattern for explaining the operation positions of a shift lever.

The shift lever 28 is, as shown in FIG. 4, operative to take a D position corresponding to a drive range, a N position corresponding to a neutral position, a R position corresponding to a reverse range, and a P position corresponding to a parking range in the direction toward the forward from the rear of the vehicle 1, so that the positions of the shift lever 28 can be shifted according to the gate pattern.

The shift lever 28 is further adapted to take a S position indicative of a manual position for shifting the gear shift ranges of the automatic transmission 5 in the manual gear shift mode, a plus position ("+" position) for indicating the shift-up, and a minus position ("−" position) for indicating the shift-down.

The S position is located in side-by-side relationship with the D position. When the shift lever 28 is laterally moved to the S position from the D position by the driver, the shift lever 28 is adapted to be retained at the S position by the spring not shown.

The EFI-ECU 13 is adapted to have the shift lever 28 move to the "+" position or the "−" position, thereby realizing a sequential shift in which the shift lever 28 moves from the current gear shift range to one upper gear shift range or one lower gear shift range.

When the shift lever 28 is moved to selectively take the "+" position or the "−" position, thereby indicating the shift-up or shift-down, the EFI-ECU 13 is adapted to execute a range hold for performing the shift-up or shift-down of the respective gear shift ranges. The EFI-ECU 13 is adapted to select an optimum gear shift stage in accordance with the vehicle speed, the throttle opening degree, and the gear shift map from among a plurality of gear shift stages ranging from an upper limit gear shift stage having a value corresponding to the gear shift range indicated by the shift lever 28, to a lower limit gear shift stage represented by the first gear shift stage. For example, when the sixth range is indicated in the manual gear shift mode, the EFI-ECU 13 is adapted to select one gear shift stage from among the first to sixth gear shift stages. When, on the other hand, the fourth range is indicated in the manual gear shift mode, the EFI-ECU 13 is adapted to select one gear shift stage from among the first to fourth gear shift stages.

The EFI-ECU 13 may be operative to execute a gear stage hold of having the current gear shift stage selectively move to one upper or lower gear shift stage in response to the movement of the shift lever 28 to the "+" position or the "−" position instead of the range hold.

Further, the following explanation is directed to the case raising an example in which the EFI-ECU 13 is operative to execute the range hold and to restrict the predetermined gear shift stage with the AI control, however, the present invention is not limited to this case but may be operative to restrict the predetermined gear shift range with the AI control. In this case, the EFI-ECU 13 is operative to set the gear shift range including the restricted gear shift stage as the restricted gear shift range. If the restricted gear shift stage is for example the fifth or sixth gear shift stage, the restricted gear shift range is the fifth or sixth range.

Further, in the manual gear shift mode, the EFI-ECU 13 is adapted to display the value of the gear shift range indicated by the shift lever 28 on a shift range indicator in a combination meter.

The EFI-ECU 13 is adapted to move to the automatic transmission mode when the EFI-ECU 13 acquires information from the operation position sensor 29 about the fact that the shift lever 28 is positioned at the D position. In the automatic transmission mode, the gear shift stages of the automatic transmission 5 can be shifted through the hydraulic pressure control circuit 6 in accordance with the vehicle speed, the throttle opening degree and the gear shift map. When, on the other hand, the EFI-ECU 13 acquires information from the operation position sensor 29 about the fact that the shift lever 28 is positioned at the S position, the EFI-ECU 13 is adapted to move to the manual transmission mode in which the gear shift stages of the automatic transmission 5 can be shifted in response to the gear shift range indicated by the driver.

The EFI-ECU 13 is adapted to memorize in the ROM a plurality of gear shift maps including a usual travelling gear shift map to be used at the usual travelling time of the vehicle 1, a high load state gear shift map to be used at the high load time of the vehicle 1, and gear shift maps to be used at the power travelling time and the snow road travelling time of the vehicle 1.

The EFI-ECU 13 is further adapted to restrict the gear shift stages in response to the travelling states of the vehicle 1, so that the EFI-ECU 13 can execute the AI control, thereby making it possible to enhance the drivability at the times of the vehicle 1 travelling on the uphill roads and the downhill roads, to protect the engine 2 and the automatic transmission 5, and to promote the warm-up operation of the engine 2.

When the EFI-ECU 13 determines in the AI control operation that the vehicle 1 is travelling on the uphill roads or the downhill roads, the EFI-ECU 13 is operative to prohibit the gear shift operation to the predetermined gear shift stage.

More specifically, the EFI-ECU 13 is adapted to refer to the shift-up map and the shift-down map preliminarily memorized in the ROM when the travelling state of the vehicle 1 and the inclined state of the road surface on which the vehicle 1 is travelling are determined in accordance with the signals inputted from the throttle sensor 24 and the output shaft rotation speed sensor 26. The shift-up map and the shift-down map are prepared with the relationships among the vehicle speeds, the inclined states of the road surfaces, and the gear shift stages at which the shift-up and the shift-down are prohibited, being correlated with one another. When the EFI-ECU 13 determines that the shift lever 28 is positioned at the D position in accordance with the signals inputted from the operation position sensor 29, the EFI-ECU 13 is adapted to control the hydraulic pressure control circuit 6 through the ECT-ECU 14 in such a manner that the gear shift stages to be formed in the transmission mechanism 4 become gear shift stages not prohibited by the shift-up map and the shift-down map. When, on the other hand, the EFI-ECU 13 determines that the shift lever 28 is positioned at the S position, the EFI-ECU 13 is adapted to permit only the shift-up or the shift-down to the gear shift range not including the gear shift stages prohibited by the shift-up map and the shift-down map.

Further, the EFI-ECU 13 determines in the AI control operation that the AT oil temperature is over the threshold value preliminarily set in accordance with the signals inputted from the AT oil temperature sensor 32, the EFI-ECU 13 is adapted to restrict the shift to the low gear shift stage, and to execute the shift-up or shift-down to the gear shift stages lower than the gear shift stages taken at the usual time. The above threshold value is set at a temperature level which can prevent the reduction of oil pressure response property and cooling property attributed to the hydraulic oil raised to high temperatures.

The vehicle 1 is provided with a navigation device 38. When the navigation device 38 is operative to receive signals transmitted from a plurality of GPS satellites through a GPS antenna 39 and to specify the current position of the vehicle 1, the navigation device 38 is adapted to transmit to the EFI-ECU 13 the road information in front of the vehicle 1 selected from among the road information preliminarily memorized in the ROM and the current position information of the vehicle 1. The EFI-ECU 13 is operative in the AI control operation to calculate the curvature of the road in front of the vehicle 1 in accordance with the road information and the current position information. When the curvature of the road in front of the vehicle 1 is larger than the predetermined value, the EFI-ECU 13 is operative to transmit to the ECT-ECU 14 the signal to restrict the upper limit gear shift stage or otherwise the signal to shift the gear shift stage to be formed in the transmission mechanism 4 from the high gear shift stage to the low gear shift stage.

When the EFI-ECU 13 determines in the AI control operation that the vehicle 1 is turning in accordance with the signal from the steering angle sensor 33 or an acceleration sensor for detecting the lateral acceleration of the vehicle 1, the EFI-ECU 13 is operative to transmit to the ECT-ECU 14 the signal to restrict the upper limit gear shift stage or otherwise the signal to shift the gear shift stage to be formed in the transmission mechanism 4 from the high gear shift stage to the low gear shift stage.

It will therefore be understood from the foregoing description that the EFI-ECU 13 partly constitutes a restriction unit as defined in the present invention.

The EFI-ECU 13 is adapted to execute the AI control not only in the case that the shift lever 28 is positioned at the D position, but also in the case that the shift lever 28 is positioned at the S position. This means that when the shift lever 28 is moved by the driver to take the "+" position or the "−" position and to have the EFI-ECU 13 inputted with the signal indicative of the shift indication, and when the EFI-ECU 13 is operated to execute the AI control, thereby restricting the gear shift stage and the gear shift range to be moved in response to the shift indication, the EFI-ECU 13 is operative to disable the shift indication by the driver and to maintain the current gear shift stage or the gear shift range. Further, the fact that the EFI-ECU 13 is operative to restrict the predetermined gear shift stage or the predetermined gear shift range in the present invention, means not only the fact that the shift to the predetermined gear shift stage or the predetermined gear shift range is prohibited by the EFI-ECU 13, but also the fact that the shift to the predetermined gear shift stage or the predetermined gear shift range is permitted by the EFI-ECU 13 in the case that the preliminarily set conditions such as a predetermined time lapse and the like are established.

Further, the EFI-ECU 13 is operative for the purpose of improving the fuel consumption to execute the gear shift indication control to instruct the driver to perform the shift-up and the shift-down from the current gear shift stage in accordance with the travelling state of the vehicle 1.

More specifically, the EFI-ECU 13 is operative to refer to the gear shift map memorized in the ROM and to calculate a target gear shift stage at which the engine 2 is operated with the fuel consumption being improved, when the EFI-ECU 13 acquires the signals indicative of the output rotation speed and the throttle opening degree respectively from the output rotation speed sensor 26 and the throttle sensor 24. The EFI-ECU 13 is adapted to present the gear shift instructions to the driver when the current gear shift stage is different from the target gear shift stage.

Further, the EFI-ECU 13 is adapted to execute a known fuel cut control to stop the fuel injection to the engine 2 when the EFI-ECU 13 receives the signal indicative of the entirely closed state of the throttle valve 31 from the throttle sensor 24 and the signal indicative of the engine rotation speed larger than or equal to a return rotation speed from the engine rotation speed sensor 21. The EFI-ECU 13 is adapted in the gear shift indication control to refer to whether or not the fuel cut control is being executed. The EFI-ECU 13 is operative in the fuel cut operation to instruct the shift-down to the driver to increase the engine rotation speed for the purpose of delaying the time to decrease the engine rotation speed to the return rotation speed to prolong the execution time of the fuel cut control.

The EFI-ECU 13 is adapted to have the ROM memorize the fuel cut continuation map for prolonging the execution time of the fuel cut control. The fuel cut continuation map is prepared in such a manner that the vehicle speed at which the shift-down is to be executed to maintain the engine rotation speed larger than or equal to the return rotation speed at the deceleration time of the vehicle 1 during the fuel cut control operation is correlated with the gear shift stage to be formed in the transmission mechanism 4 by the shift-down. The previously mentioned return rotation speed is defined as a lower limit value of the engine rotation speed at which no engine stall is generated when the fuel supply to the engine 2 is resumed after the fuel cut control is finished. This means that the vehicle speed at which the shift-down is to be executed is defined as a vehicle speed converted from the return rotation speed in accordance with the gear ratio of the transmission mechanism 4 and the gear ratio of the final gear, etc.

The EFI-ECU 13 is operative to calculate the vehicle speed in accordance with the signal inputted from the output shaft rotation speed sensor 26. When the EFI-ECU 13 determines that the vehicle speed is decreased to the vehicle speed described in the fuel cut continuation map, the EFI-ECU 13 is operated in the automatic gear shift mode to execute the gear shift through the ECT-ECU 14, and in the manual gear shift mode to set the gear shift stage to be shift-downed as the target gear shift stage.

It will therefore be understood from the foregoing description that the EFI-ECU 13 partly constitutes a target gear shift stage setting unit that sets a target gear shift stage in accordance with the travelling state of the vehicle as defined in the present invention.

The EFI-ECU 13 is adapted to control the display unit 35 to light the shift-up lamp 36 or the shift-down lamp 37 to present the gear shift indication to the driver when the gear shift request is generated as previously mentioned.

It will therefore be understood from the foregoing description that the EFI-ECU 13 partly constitutes a presentation unit that presents the gear shift instructions when the current gear shift stage and the target gear shift stage are different from each other as defined in the present invention.

The EFI-ECU 13 may be operative to perform the shift-up indication or the shift-down indication for the driver to be able to recognize means such as audio signals and other signals in lieu of the indication by the display unit 35 according to the present invention.

The EFI-ECU 13 is adapted to restrict the gear shift indication on the display unit 35 if the target gear shift stage calculated in the gear shift indication control operation is restricted in the AI control operation by the EFI-ECU 13.

More specifically, the EFI-ECU 13 is adapted to determine whether or not the AI control is under execution during the execution of the gear shift indication control, and to refer to the information indicative of the gear shift stage restricted by the AI control when the EFI-ECU 13 determines that the AI control is under execution. The EFI-ECU 13 is operative not to present the gear shift stage to the display unit 35 irrespective of the gear shift request generated if the target gear shift stage calculated in the gear shift indication control operation is included in the gear shift stages restricted by the AI control.

The following explanation will be made about the operation of the gear shift indication control with reference to FIG. 5. The processing to be explained hereinafter is realized by the program preliminarily memorized in the ROM of the EFI-ECU 13, and is executed at a predetermined time interval by the CPU under the condition that the shift lever 28 is positioned at the S position.

Figure 5:
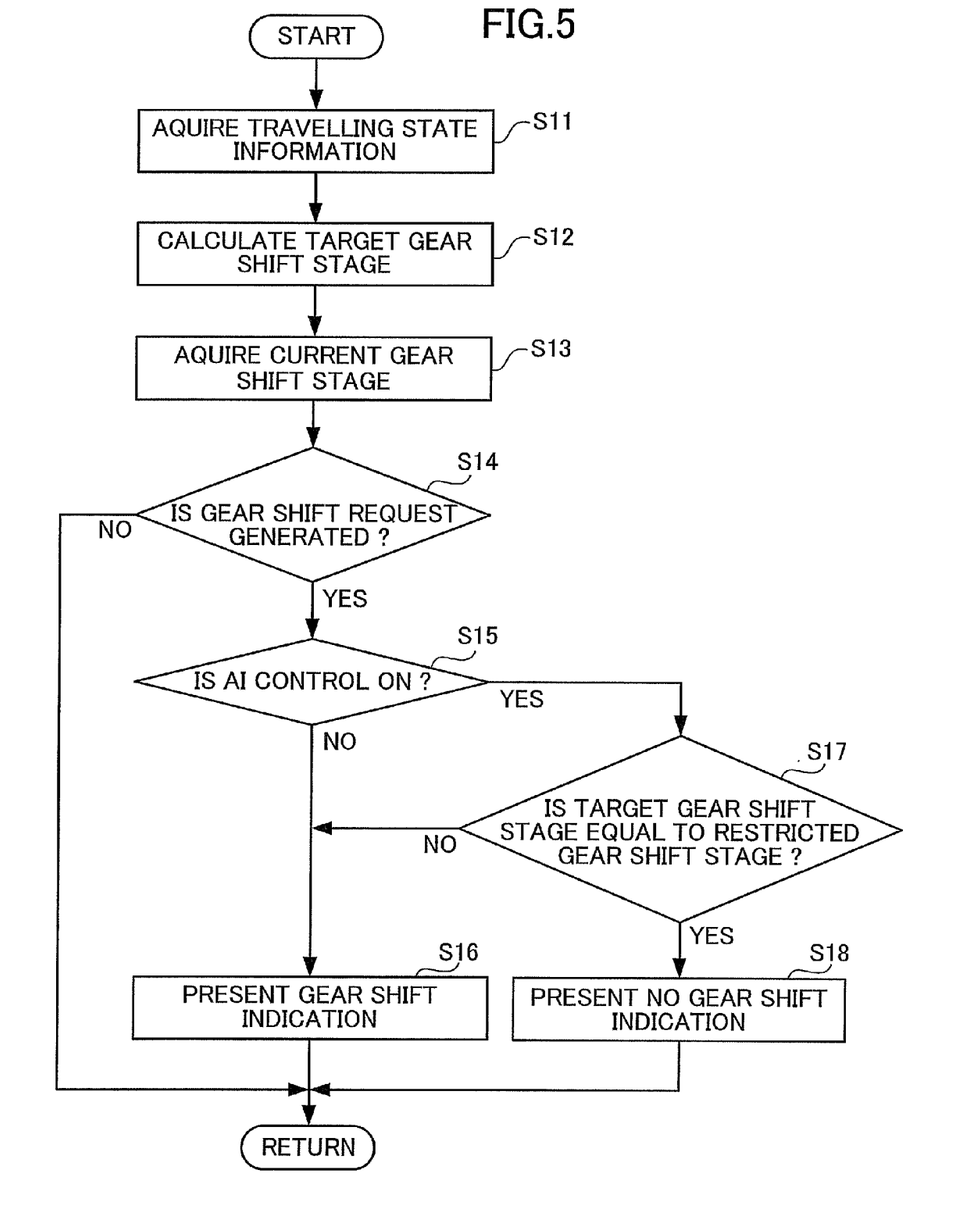
FIG. 5 is a flow chart showing a gear shift indication control according to the embodiment of the present invention.

As shown in FIG. 5, the EFI-ECU 13 acquires the information about the travelling state of the vehicle 1 (Step S11). The EFI-ECU 13 is operative in the present embodiment to acquire as the travelling state of the vehicle 1 the signals indicative of the output shaft rotation speed and the throttle opening degree respectively from the output shaft rotation speed sensor 26 and the throttle sensor 24, and to calculate the vehicle speed of the vehicle 1 in accordance with the signal inputted from the output shaft rotation speed sensor 26. Further, the EFI-ECU 13 is adapted to refer to whether or not the fuel cut control is under execution.

The EFI-ECU 13 is then operated to calculate the target gear shift stage for improving the fuel consumption in accordance with the information about the travelling state acquired in the Step S11 (Step S12). More specifically, the EFI-ECU 13 is operated to refer to the gear shift map memorized in the ROM and indicative of the target gear shift stage for improving the fuel consumption, and to calculate the target gear shift stage from the information about the throttle opening degree acquired and the vehicle speed calculated in the Step S11 if the fuel cut control is not under execution. If the fuel cut control, on the other hand, is under execution, the EFI-ECU 13 is operated to refer to the fuel cut continuation map previously mentioned, and to set the gear shift stage to be shift-downed as the target gear shift stage if the vehicle speed calculated in accordance with the signal inputted from the output shaft rotation speed sensor 26 is decreased to the vehicle speed to be shift-downed.

The EFI-ECU 13 is then operated to acquire the current gear shift stage (Step S 13). More specifically, the EFI-ECU 13 is operated to acquire the signals respectively indicative of the input shaft rotation speed and the output shaft rotation speed of the transmission 4 from the input shaft rotation speed sensor 25 and the output shaft rotation speed sensor 26. The EFI-ECU 13 is operated to refer to the map indicating that the ratio of the input shaft rotation speed and the output shaft rotation speed of the transmission 4 is correlated with the gear shift stage, and to calculate the current gear shift stage to be formed in the transmission mechanism 4.

The EFI-ECU 13 is then operated to determine whether or not the gear shift request is generated (Step S14). More specifically, the EFI-ECU 13 is operated to determine whether or not the target gear shift stage calculated in the Step S12 is different from the current gear shift stage calculated in the Step S13. When the target gear shift stage is determined by the EFI-ECU 13 to be different from the current gear shift stage, the EFI-ECU 13 determines that the gear shift request is generated (YES in Step S14) and moves to the Step S15. When, on the other hand, the target gear shift stage is determined by the EFI-ECU 13 to be equal to the current gear shift stage, the EFI-ECU 13 determines that the gear shift request is not generated (NO in Step S14) and moves to the RETURN.

The EFI-ECU 13 is then operated to determine whether or not the AI control is under execution (Step S15). More specifically, the EFI-ECU 13 is adapted to erect a flag indicative of the AI control being under execution during the execution of the AI control, and to refer to this flag to determine whether or not the AI control is under execution.

When the EFI-ECU 13 determines that the AI control is not under execution (NO in Step S15), the EFI-ECU 13 is operated to control the display unit 35 to present the gear shift indication by lighting the shift-up lamp 36 or the shift-down lamp 37 (Step S16).

When, on the other hand, the EFI-ECU 13 determines that the AI control is under execution (YES in Step S15), the EFI-ECU 13 is operated to determine whether or not the target gear shift stage calculated in the Step S12 is the restricted gear shift stage prohibited in the AI control operation (Step S17).

When the EFI-ECU 13 determines that the target gear shift stage is not the restricted gear shift stage prohibited in the AI control operation (NO in Step S17), the EFI-ECU 13 moves to the Step S16 to present the gear shift indication as previously described.

When, on the hand, the EFI-ECU 13 determines that the target gear shift stage is the restricted gear shift stage prohibited in the AI control operation (YES in Step S17), the EFI-ECU 13 moves to the Step S18 not to present the gear shift indication by not lighting the shift-up lamp 36 and the shift-down lamp 37.

As will be appreciated from the foregoing description, the EFI-ECU 13 according to the present embodiment can prevent the gear shift indication to the restricted gear shift stage from being performed, thereby making it possible to prevent the bothersome feelings from being given to the driver for the gear shift indications.

Further, the EFI-ECU 13 can prevent the display unit from performing the gear shift indication to the restricted gear shift stage in the case that the gear shift stages are shifted by the manual gear shift. The EFI-ECU 13 can also prevent the display unit from performing the gear shift indication to the restricted gear shift range having the restricted gear shift stage as the upper limit gear shift stage in the case that the gear shift ranges are shifted. As a result, it is possible to prevent the bothersome feelings from being given to the driver for the gear shift indications by the display unit 35.

Further, the EFI-ECU 13 can encourage the driver to perform the gear shift to the gear shift stage at which the fuel consumption can be improved, so that the fuel consumption of the vehicle can be improved, and the gear shift indication to the restricted gear shift stage can be prevented from being carried out, thereby making it possible to prevent the bothersome feelings from being given to the driver.

For example, when the vehicle 1 is travelling on the rugged roads having surfaces inclined such as mountainous roads, the EFI-ECU 13 can prevent the busy shift having the gear shift stages shifted every time the accelerator pedal is depressed or released by the driver. Further, the EFI-ECU 13 can prevent the gear shift indication to the restricted gear shift stage from being carried out even in the travelling state of the vehicle 1 as previously mentioned, thereby making it possible to prevent the bothersome feelings from being given to the driver for the gear shift indications.

Further, the EFI-ECU 13 restricts the gear shift to the low gear shift stage, thereby making it possible to protect the automatic transmission 5 when the temperature of the hydraulic oil is at a high temperature level. Even in the travelling state of the vehicle 1 as above mentioned, the EFI-ECU 13 can prevent the gear shift indication to the restricted gear shift stage from being carried out, thereby making it possible to prevent the bothersome feelings from being given to the driver for the gear shift instructions.

Further, the EFI-ECU 13 can restrict the gear shift stage and to optimize the travelling of the vehicle 1 in accordance with the signal inputted from the navigation device 38, and can prevent the gear shift indication to the restricted gear shift stage from being carried out even in the travelling state of the vehicle 1 as above mentioned, thereby making it possible to prevent the bothersome feelings from being given to the driver for the gear shift instructions.

The previous explanation has been directed to the case in which the EFI-ECU 13 is operative not to present the gear shift indication when the target gear shift stage for realizing the low fuel consumption is the restricted gear shift stage prohibited to be formed in the AI control operation. However, the EFI-ECU 13 may be operated to present the gear shift indication after the predetermined time lapses when the target gear shift stage for realizing the fuel consumption is the restricted gear shift stage prohibited to be formed in the AI control operation.

Figure 6:
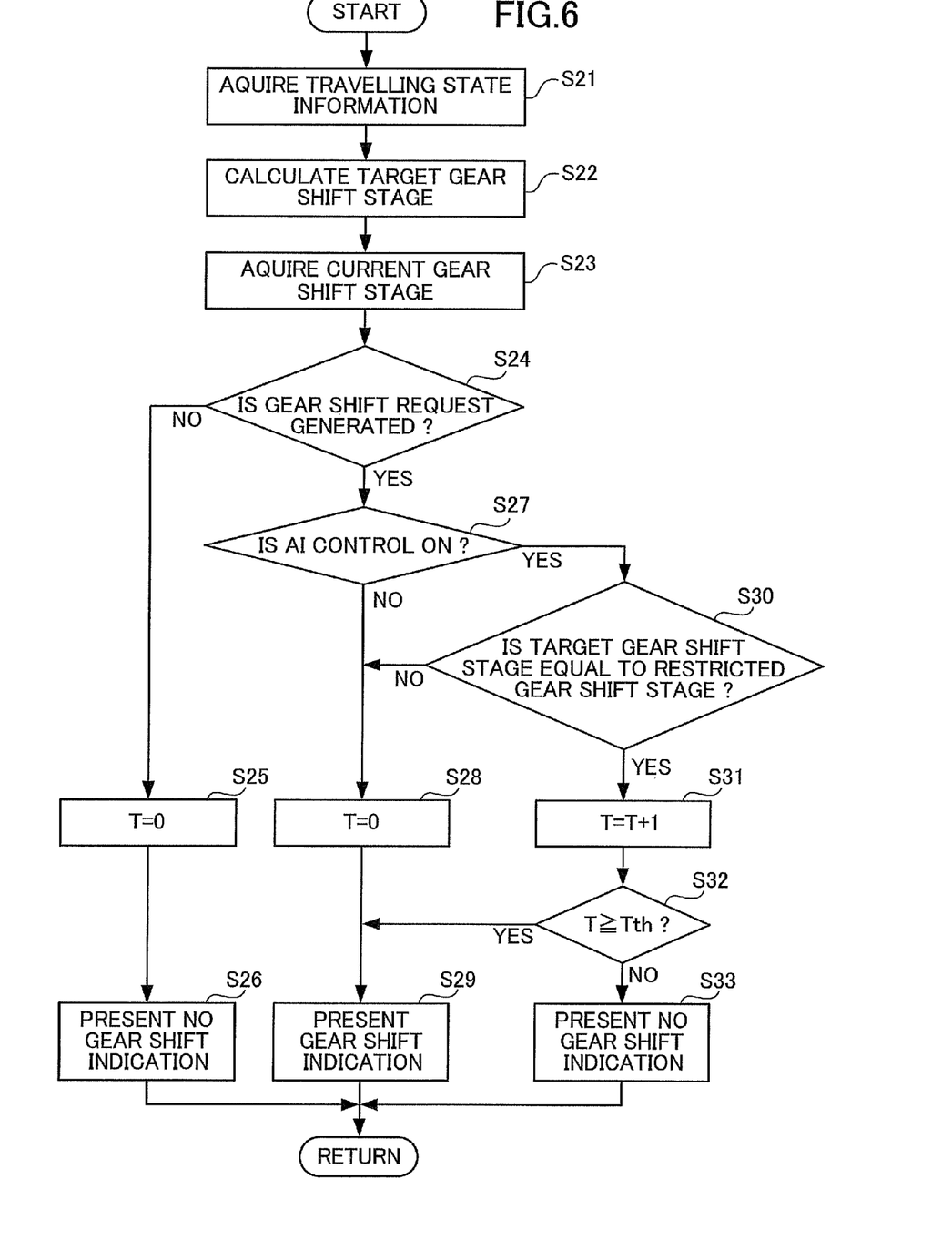
FIG. 6 is a flow chart showing another example of the gear shift indication control according to the embodiment of the present invention.

The following explanation will be made with reference to FIG. 6 about the operation of the gear shift indication in which the gear shift indication is presented after the predetermined time lapses.

The processing to be explained hereinafter is realized by the program preliminarily memorized in the ROM of the EFI-ECU 13, and is executed at a predetermined time interval by the CPU under the condition that the shift lever 28 is positioned at the S position.

Firstly, the EFI-ECU 13 acquires the information about the travelling state of the vehicle 1 (Step S21) in a similar manner to the Step S11 to the Step S13 previously mentioned. The EFI-ECU 13 is operative to calculate the target gear shift stage for realizing the low fuel consumption in accordance with the information acquired about the travelling state of the vehicle 1 (Step S22), and to acquire the information about the current gear shift stage (Step S23).

The EFI-ECU 13 is then operated to determine whether or not the gear shift request is generated in the similar manner to the Step S14 previously mentioned (Step S24).

When the EFI-ECU 13 determines that the gear shift request is not generated (NO in Step S24), the EFI-ECU 13 moves to the Step S25 and has the time counted at zero by a timer. At this time, the EFI-ECU 13 is operated not to present the gear shift indication (Step S26) since the gear shift request is not generated.

When, on the other hand, the EFI-ECU 13 determines that the gear shift request is generated (YES in Step S24), the EFI-ECU 13 is operated to determine whether or not the AI control is under execution in the similar manner to the Step S15 previously mentioned (Step S27).

When the EFI-ECU 13 determines that the AI control is not under execution (NO in Step S27), the EFI-ECU 13 moves to the Step S28 and has the time counted at zero by the timer. At this time, the EFI-ECU 13 is operated to present the gear shift indication to shift-up or shift-down the gear shift stage to the target gear shift stage calculated in the Step S22 (Step S29).

When, on the other hand, the EFI-ECU 13 determines that the AI control is under execution (YES in Step S27), the EFI-ECU 13 is operative determine whether or not the target gear shift stage calculated in the Step S22 is the restricted gear shift stage prohibited in the AI control operation (Step S30).

When the EFI-ECU 13 determines that the target gear shift stage is not the restricted gear shift stage prohibited in the AI control operation (NO in Step S30), the EFI-ECU 13 moves to the Step S28 and presents the gear shift indication as previously mentioned.

When, on the other hand, the EFI-ECU 13 determines that the target gear shift stage is the restricted gear shift stage prohibited in the AI control operation (YES in Step S30), the EFI-ECU 13 moves to the Step S31 and executes the counting operation by the timer (Step S31). Here, the equation, T=T+1 means the continuing counting operation by the timer.

Next, the EFI-ECU 13 is operative to determine whether or not the counting operation by the timer is performed for the predetermined time Tth or more (Step S32). Here, the predetermined time Tth means, for example, a few seconds and other time period sufficiently longer than the time period in which the usual gear shift indication is performed.

When the EFI-ECU 13 determines that the counting operation by the timer is performed for the predetermined time Tth or more (YES in Step S32), the EFI-ECU 13 moves to the Step S29 and is operated to present the gear shift indication to shift-up or shift-down the gear shift stage to the target gear shift stage calculated in the Step S22 (Step S29).

When, on the other hand, the EFI-ECU 13 determines that that the counting operation by the timer is not performed for the predetermined time Tth (NO in Step S32), the EFI-ECU 13 moves to the Step S29 and is operated not to present the gear shift indication by not lighting the shift-up lamp 36 and the shift-down lamp 37 (Step S33).

As will be appreciated from the foregoing description, the EFI-ECU 13 according to the present embodiment can reduce the frequency of performing the gear shift indication to the restricted gear shift stage, thereby making it possible to prevent the bothersome feelings from being given to the driver for the gear shift indications.

The above explanation has been made about the case in which the gear shift indicator according to the present invention is applied to the FR vehicle having the 6-speed automatic transmission 5 mounted thereon.

However, the gear shift indicator according to the present invention may be applied to a vehicle having mounted thereon an automatic transmission with more or less than 6-speed gear shift stages, and to a FF (Front engine Front drive) vehicle. The construction of the automatic transmission 5 in the present embodiment is simply raised as one example, but the automatic transmission 5 may be of a construction other than the construction previously mentioned according to the present invention.

Further, the gear shift indicator according to the present invention may be applied not only to the automatic transmission provided with the planetary gear device, but also to a mechanical type of automatic transmission which can automatically perform the gear shift in response to the manual operation carried out by the driver. As one example of the mechanical types of automatic transmissions there is a sequential manual transmission constructed by a transmission having a gear train of the type having gears held in mesh with each other at all times. The sequential manual transmission is operative to have the intermittent operations of the clutches performed not by the manual operation but automatically executed by using an electric motor and the like, and have the gear shift operations of the gear shift stages operated not by the manual operation but automatically performed by the operation of the electric motor or the like in response to the operation of the shift lever.

Further, the foregoing explanation has been made about the case in which the electronic control device 11 is provided with the EFI-ECU 13 and the ECT-ECU 14, and the EFI-ECU 13 is operative to execute the gear shift indication control and the AI control. However, the gear shift indication control and the AI control may be executed by any one of ECUs mounted on the vehicle 1, or otherwise may be respectively executed by the ECUs different from each other according to the present invention. Further, the gear shift indication control and the AI control may be executed by a plurality of ECUs cooperated with each other according to the present invention.

Further, the foregoing explanation has been made about the case in which the EFI-ECU 13 determines that the gear shift request is generated when the target gear shift stage is different from the current gear shift stage. However, the EFI-ECU 13 may determine that the gear shift request is generated if the upper limit gear shift stage of the gear shift range selected by the driver is different from the current gear shift stage even when the target gear shift stage is equal to the current gear shift stage at the execution time of the range hold according to the present invention. Further, the EFI-ECU 13 may execute the previously mentioned gear shift indication control in either the case of the range hold or the case of the gear stage hold according to the present invention.

It will be understood from the foregoing description that the gear shift indicator according to the present invention is of advantageous effect making it possible to reduce the bothersome feelings to be given to the driver, and is useful as a gear shift indicator for a vehicle provided with a transmission by which the manual gear shift can be realized.

REFERENCE SIGNS LIST

1: vehicle
2: engine
3: torque convertor
4: transmission mechanism
5: automatic transmission
6: hydraulic pressure control circuit
11: electronic control device
13: EFI-ECU
14: ECT-ECU
21: engine rotation speed sensor
22: intake air amount sensor
23: intake air temperature sensor
24: throttle sensor
25: input shaft rotation speed sensor
26: output shaft rotation speed sensor
27: brake sensor
28: shift lever
29: operation position sensor
30: accelerator opening degree sensor
31: throttle valve
32: AT oil temperature sensor
33: steering angle sensor
35: display unit
36: shift-up lamp
37: shift-down lamp
38: navigation device
39: GPS antenna
41: pump impeller
42: input shaft
43: turbine impeller
44: one-way clutch
45: stator impeller
46: lock-up clutch
47: oil pump
52: output shaft

The invention claimed is:

1. A gear shift indicator used in a vehicle having mounted thereon a manual gear transmission capable of performing a manual gear shift, and encouraging gear shift instructions to a driver, the gear shift indicator comprising:

a target gear shift stage setting unit that sets a target gear shift stage in accordance with a vehicle speed and a throttle opening degree of the vehicle, a presentation unit that presents the gear shift instructions facilitating a transition to the target gear shift stage when a current gear shift stage is different from the target gear shift stage set by the target gear shift stage setting unit, and a restriction unit that restricts the current gear shift stage from being transferred to a predetermined gear shift stage in accordance with at least one of a travelling state of the vehicle and road conditions ahead of the vehicle in travelling, wherein (i) the presentation unit is operative to refer to information indicative of the gear shift stage restricted by the restriction unit under a condition that the restriction for a transition to the predetermined gear shift stage is executed by the restriction unit and not to present the gear shift instructions when the target gear shift stage is a gear shift stage restricted by the restriction unit, and (ii) the presentation unit is operative to present the gear shift instructions under the condition that the restriction for the transition to the predetermined gear shift stage is not executed by the restriction unit.

2. The gear shift indicator as set forth in claim 1, wherein the presentation unit is operative to present either one of the target gear shift stage and gear shift ranges having an upper limit gear shift stage constituted by the target gear shift stage.

3. The gear shift indicator as set forth in claim 1, wherein the target gear shift stage setting unit is operative to set the gear shift stage of reducing fuel consumption lower than that of the current gear shift stage as the target gear shift stage.

4. The gear shift indicator as set forth in claim 1, wherein the restriction unit is operative to set a gear shift stage to be restricted in accordance with a degree of inclination of a road surface on which the vehicle is travelling.

5. The gear shift indicator as set forth in claim 1, wherein the restriction unit is operative to set a gear shift stage to be restricted in accordance with an oil temperature of hydraulic oil to be supplied to the gear transmission.

6. The gear shift indicator as set forth in claim 1, wherein the vehicle is provided with a navigation device for outputting signals indicative of information about a current position of the vehicle and at least information about roads ahead of the current position, and the restriction unit is operative to set the restricted gear shift stage in accordance with the signal inputted from the navigation device.

7. The gear shift indicator as set forth in claim 1, wherein the presentation unit is operative to present the gear shift instructions after a predetermined time lapses when the target gear shift stage is a gear shift stage restricted by the restriction unit.

8. The gear shift indicator as set forth in claim 7, wherein the target gear shift stage setting unit is operative to set a gear shift stage of reducing fuel consumption lower than that of the current gear shift stage as the target gear shift stage.

9. The gear shift indicator as set forth in claim 7, wherein the restriction unit is operative to set a gear shift stage to be restricted in accordance with a degree of inclination of a road surface on which the vehicle is travelling.

10. The gear shift indicator as set forth in claim 7, wherein the restriction unit is operative to set a gear shift stage to be restricted in accordance with an oil temperature of hydraulic oil to be supplied to the gear transmission.

11. The gear shift indicator as set forth in claim 7, wherein the vehicle is provided with a navigation device for outputting signals indicative of information about a current position of the vehicle and at least information about roads ahead of the current position, and the restriction unit is operative to set the restricted gear shift stage in accordance with the signal inputted from the navigation device.

\* \* \* \* \*